(12) United States Patent
Fecteau et al.

(10) Patent No.: US 12,007,798 B2
(45) Date of Patent: Jun. 11, 2024

(54) FLUID TOP-OFF DETECTION AND CONTROL SYSTEM

(71) Applicant: PITCO FRIALATOR, INC., Bow, NH (US)

(72) Inventors: Michael T. Fecteau, Derry, NH (US); Steven J. Cyr, Londonderry, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 831 days.

(21) Appl. No.: 16/980,227

(22) PCT Filed: Mar. 15, 2019

(86) PCT No.: PCT/US2019/022389
§ 371 (c)(1),
(2) Date: Sep. 11, 2020

(87) PCT Pub. No.: WO2019/178431
PCT Pub. Date: Sep. 19, 2019

(65) Prior Publication Data
US 2021/0034081 A1  Feb. 4, 2021

Related U.S. Application Data

(60) Provisional application No. 62/643,882, filed on Mar. 16, 2018.

(51) Int. Cl.
*G05D 9/12* (2006.01)
*A47J 37/12* (2006.01)
*G01F 23/263* (2022.01)

(52) U.S. Cl.
CPC ............ *G05D 9/12* (2013.01); *A47J 37/1266* (2013.01); *A47J 37/1271* (2013.01); *G01F 23/268* (2013.01)

(58) Field of Classification Search
CPC . A47J 37/1266; A47J 37/1271; G01F 23/265; G01F 23/268; G05D 9/12
(Continued)

(56) References Cited

U.S. PATENT DOCUMENTS

2007/0040559 A1\* 2/2007 Klun ...................... G01N 33/03
324/453
2011/0043224 A1\* 2/2011 Yu .......................... G01N 33/03
324/658
(Continued)

FOREIGN PATENT DOCUMENTS

EP  0095063 A2  11/1983
GB  2314631 A   1/1998

*Primary Examiner* — Dana Ross
*Assistant Examiner* — Joseph W Iskra
(74) *Attorney, Agent, or Firm* — Seyfarth Shaw LLP; Brian Michaelis

(57) ABSTRACT

A capacitive sensor and control system is configured to detect the presence (or absence) of fluid within a container. Configured in a vat of a deep fryer, the sensor determines when a level of liquid within the vat is at or above the level of the sensor. The sensor is in communication with the control system and the sensor sends a signal to the control system representative of the presence or absence of liquid within the vat and at the level of the sensor. The controller receives the signal from the sensor, and allows operation of a fluid management system and its associated plumbing to maintain an appropriate level of liquid in the vat.

10 Claims, 10 Drawing Sheets

(58) Field of Classification Search
USPC .......................................................... 99/330
See application file for complete search history.

(56) References Cited

U.S. PATENT DOCUMENTS

| 2013/0295245 | A1 | 11/2013 | Gardner et al. |
| 2015/0374173 | A1 | 12/2015 | McGhee et al. |
| 2017/0095117 | A1* | 4/2017 | Savage .................. B30B 9/047 |

* cited by examiner

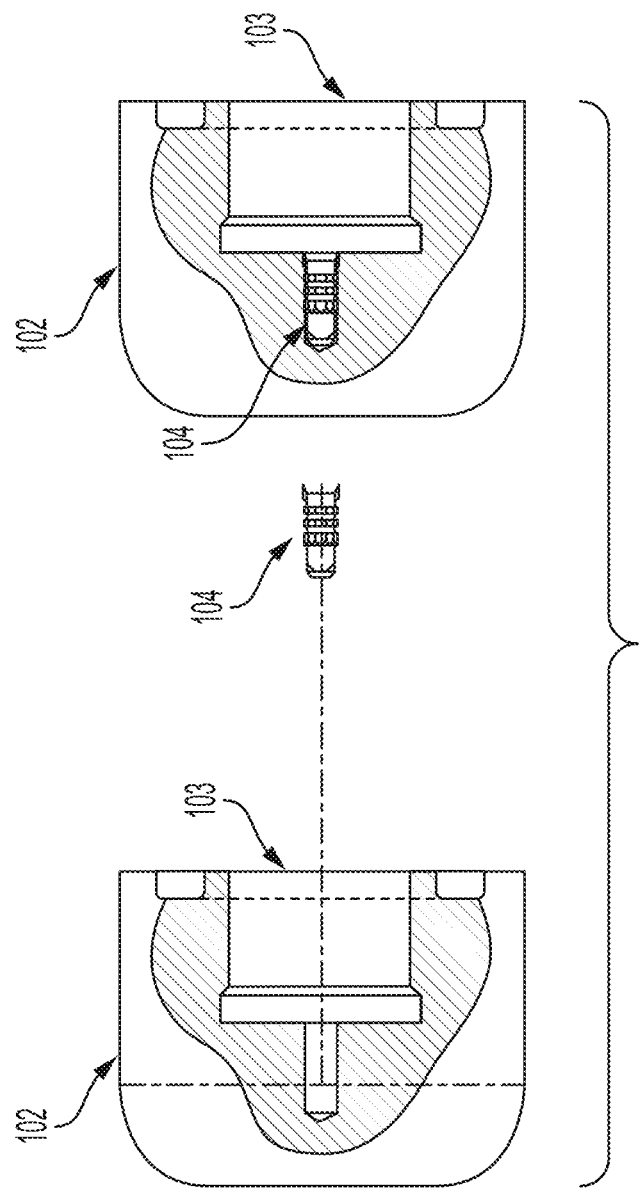

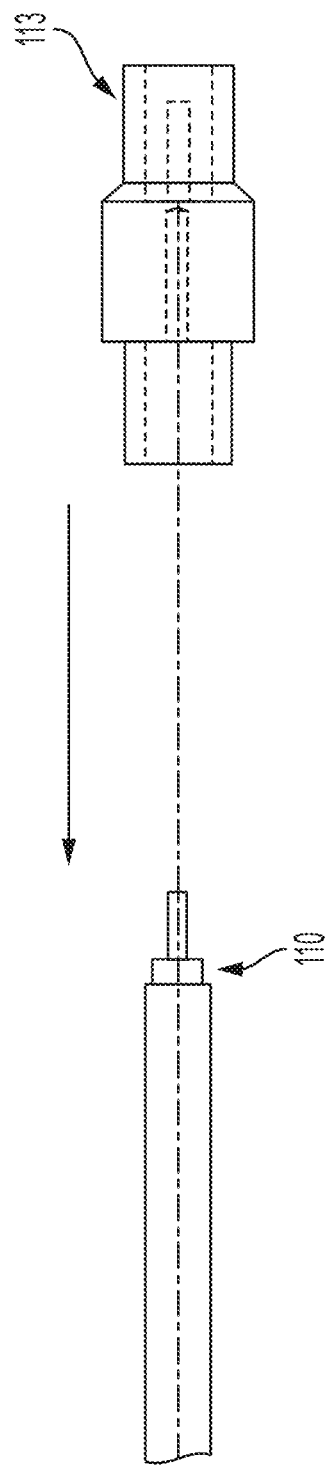

FLUID TOP-OFF DETECTION AND CONTROL SYSTEM

The present application is a National Stage application of International Application No. PCT/US2019/022389, filed Mar. 15, 2019, which claims priority to U.S. Provisional Patent Application No. 62/643,882, filed Mar. 16, 2018, both of which are incorporated by reference herein in their entireties.

TECHNICAL FIELD

This specification relates to control systems for fluid heating sources, and sensors implemented in conjunction with such control systems.

BACKGROUND

Control systems are known, for controlling operation of energy or heat sources, such as in controlled cooking systems. In some known systems, such as deep frying cooking systems, control systems and associated sensor(s) may be used to detect the presence or level of fluids in the system. For example, in a deep fryer context, a control system and associated sensor(s) may be implemented to detect the level of cooking oil or other fluid in a deep fryer and, if needed, add or remove fluid from the system.

Known control systems may include sensors, such as level sensors and temperature sensors, that directly sense the level of fluid based on position of a float on a shaft or by temperature. In a cooking system context, the environment in which the sensor is used may not be conducive to smooth, continuous operation. For example, in a deep fryer context, debris may be present in the fluid in the system and create impediments to the float riding freely along the shaft. The float may become stuck at a level that does not indicate the actual level of fluid. Sticking floats can create problems in such systems, such as providing for operation of the burner/heater when insufficient fluid is in the system.

Capillary sensors are also known for fluid level sensing. Capillary sensors receive fluid into a capillary tube and determine level as a function of the location of the fluid within the tube. In cooking environments, such as a deep fryer context to determine level of fluid in a fry vat, capillary sensors may be problematic due to differences in viscosity of the fluid that may need to be sensed. For example, some cooking fluids at certain temperatures will be in a partially solid phase so that capillary action within a capillary tube is not effective and level cannot be sensed (e.g. if the fluid is a solid at low temperatures such as is the case with lard).

Also, capillary sensors may retain fluid in the capillary creating unsanitary conditions in use in a food-related context, because spaces within the capillary that retain fluid cannot easily be cleaned. Still further, air pockets or bubbles that may be retained within the capillary will be subject to temperature changes (sometimes extreme) that can cause sensor failure.

BRIEF SUMMARY

The present disclosure provides a sensor and control system that operates across a wide range of viscosities of fluid, from partially solid to low viscosity. According to one embodiment, a highly reliable and sanitary sensor is implemented as a capacitive sensor that determines capacitance of the fluid that surrounds the sensor. In an illustrative embodiment, the sensor may be disposed extending from a grounded structure of a container within which fluid is contained, e.g. extending from the wall(s) of a vat in a deep fryer, wherein fluid in the vat may be fluid for cooking (e.g. cooking oil, lard or the like). Alternatively, the sensor may also be aligned vertically or horizontally in or recessed from the vat. The sensor may be configured and disposed to sense the capacitance of fluid in which the sensor is disposed, e.g. between the sensor and a wall of the vat, and thereby determine the relative capacitance of the fluid (and presence or absence of same) surrounding the sensor in the vat.

The system according to one aspect comprises a capacitive sensor in communication with sensor electronics. The sensor electronics interface with a microcontroller or processor that is in communication with a fluid management system for control of a fluid provisioning subsystem and its associated plumbing. In the illustrative cooking vat context, the microcontroller is in communication with a fluid management system that controls plumbing equipment (e.g., valves, pumps and piping) for the movement, addition and removal of fluid from the cooking vat.

In operation, in one illustrative embodiment, the capacitance of cooking oil (e.g. heated or around room temperature) may be significantly different than the capacitance of air. The controller, which receives a signal from the sensor electronics that is representative of the measured capacitance from the sensor, can determine the presence of fluid proximate to the sensor and thereby activate the fluid management system to supplement and/or remove fluid from the cooking vat.

In some embodiments, the sensor may be calibrated such that the sensed capacitance (and therefore the existence and level of fluid proximate to the sensor) is specifically based upon the position of the sensor with respect to the walls, cavities and/or structures of the vat.

In an illustrative embodiment of a deep fryer, the fryer may have a vat for receipt of a volume of oil. A sensor may be positioned within the vat such that the sensor is in contact with the volume of oil disposed in the vat. The sensor may be configured to detect the presence of oil within the vat when the level of oil is at or above the level of the sensor. The capacitive sensor may be in communication with the controller and send a signal, via sensor electronics, to the controller representative of the presence or absence of oil within the vat at the level of the sensor. The controller may interface to a fluid management system. The fluid management system, in turn, may control operation of one or more components responsible for moving fluid through the system. The condition sensed and reported by the sensor may dictate the operation of pumps and valves to supplement to (or remove from) the system a volume of fluid. The sensor may indicate a lack of fluid, in which case the controller may instruct the fluid management system to allow for the flow of additional fluid into the vat from a storage tank, for example.

Advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIGS. 2A-2E are detailed views of components and assemblies of the capacitive sensor of FIG. 1.

DETAILED DESCRIPTION

Figure 1:
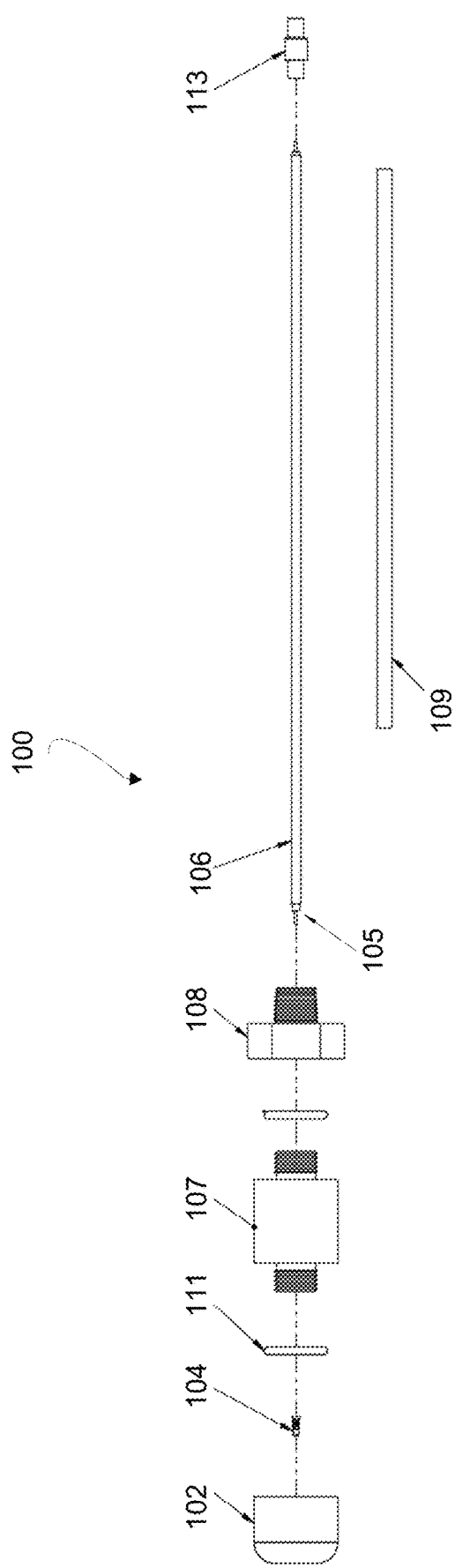
FIG. 1 is an exploded view of a capacitive sensor according to the disclosure.
Figure 2A:
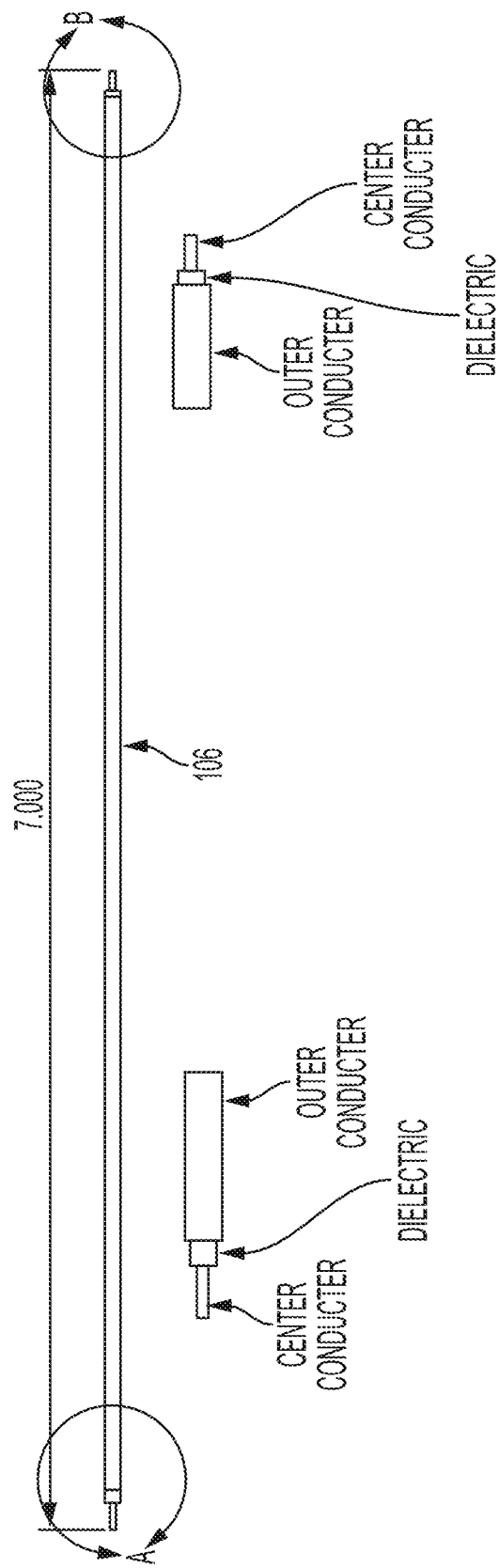
Figure 2D:
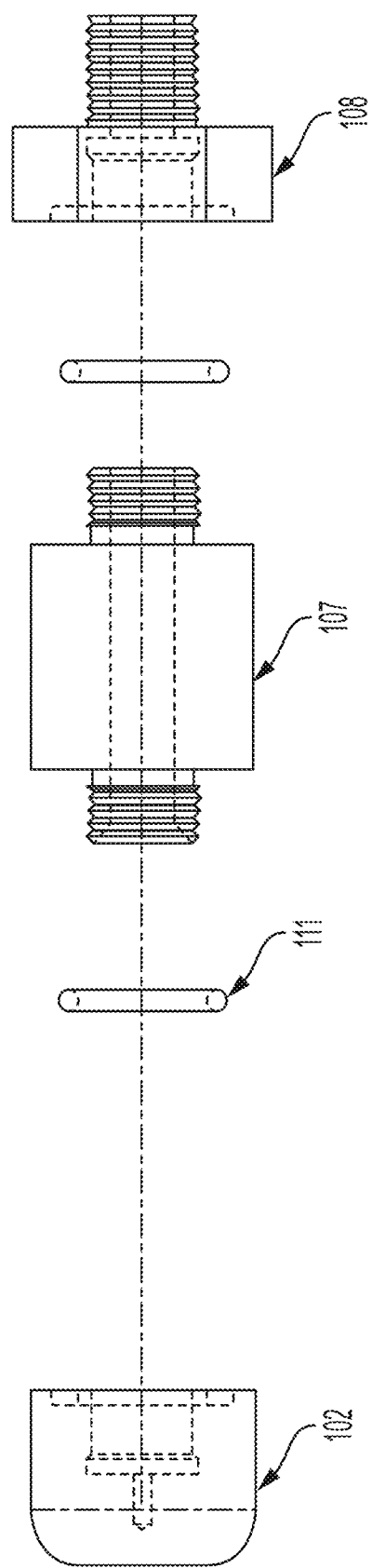
Figure 2E:
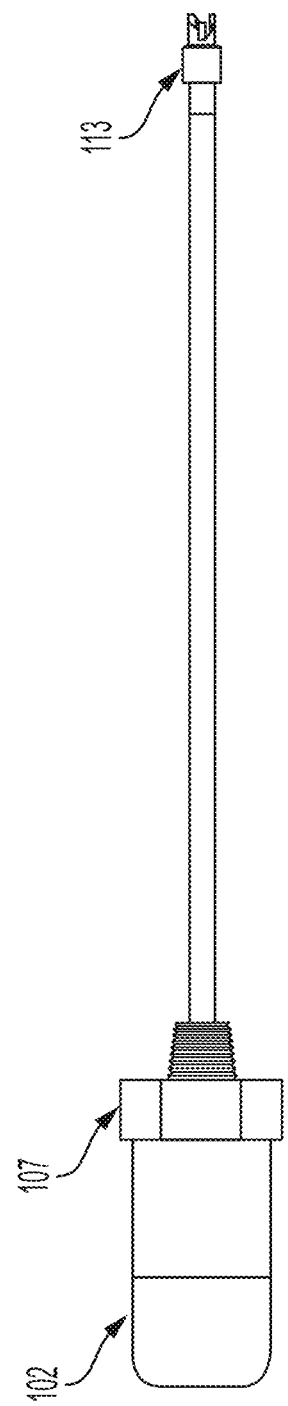

A capacitive sensor probe constructed for installation in a fluid environment, according to the disclosure, is illustrated in FIG. 1. The sensor probe is configured and constructed to operate across a wide range of viscosities of fluid, from partially solid to low viscosity, at a wide range of temperatures, and is generally constructed of materials that are "food safe" as the materials may be used in a cooking environment in contact with foodstuffs. In operation, as described in more detail hereinafter, the capacitive sensor probe acts as one "plate" of a capacitor, in conjunction with a metallic portion of the environment in which the probe is housed as a second plate (e.g. a portion of a metallic fryer vat) with the fluid disposed in the environment acting as a dielectric of the capacitor.

The sensor is implemented as a capacitive sensor that senses the capacitance of the fluid surrounding the sensor. In an illustrative embodiment the sensor according to the disclosure is disposed on or through the wall of a vat, e.g. in a deep fryer, wherein fluid in the vat may be fluid for cooking (e.g. cooking oil, lard or the like). The sensor is configured and disposed to sense the capacitance between the sensor and wall of the vat and thereby determine the relative capacitance of the fluid in the vat, from which it can be determined that sufficient fluid is present to provide pertinent information to a control system. Alternatively, the sensor may be disposed vertically in the vat, or may be disposed horizontally or vertically within an open cavity formed in a side wall of the vat.

A capacitive sensor probe according to the disclosure is best illustrated in FIGS. 1, and 2A-2E. The sensor may include a metal cylindrical shell or probe radiator 102 that is disposed at an extreme end (e.g. the top) of the sensor assembly. The metallic shell/radiator 102 includes a recess 103 (best seen in FIG. 2B) that receives a receptacle 104 press fit into the shell 102 for electrically conductive engagement with the shell 102. The receptacle 104 is configured to receive a stripped cable end 105 (Detail A of FIG. 2A) of a coaxial cable having a center conductor, dielectric around the center conductor, and outer conductor, forming a coaxial electrode 106. The center conductor is in electrical continuity with the metal radiator 102. The radiator 102 abuts an insulator 107 that is configured to fit adjacent the radiator. In this illustrative embodiment, the insulator 107 has threads that are configured to thread into the recess 103 of the radiator 102. An O-ring 111 may be disposed between the radiator 102 and insulator 107. The insulator 107 may be made from PTFE, PEEK or other materials that insulate against electrical transmission and/or heat transmission and are also capable of withstanding temperatures such as up to about 500 degrees Fahrenheit. A sensor mount 108 is disposed adjacent to and abuts the insulator 107 and may have an O-ring disposed therebetween. The insulator 107 and sensor mount 108 are hollow so that the coaxial electrode 106 can extend through those bodies. The coaxial electrode 106 may be encased in PTFE heat shrink tube 109. A stripped cable end 110 of the coaxial electrode 106, distal from the radiator 102 is connected to a connector jack 113, with the outer conductor of the coaxial cable in electrical continuity with a shell portion of the connector jack 113. In some embodiments of the capacitive sensor, a fitting (not shown) may be provided below the radiator 102 or below the insulator 107, to configure the sensor to be attached to and removed from the system for inspection, cleaning, replacement or the like.

Figure 3:
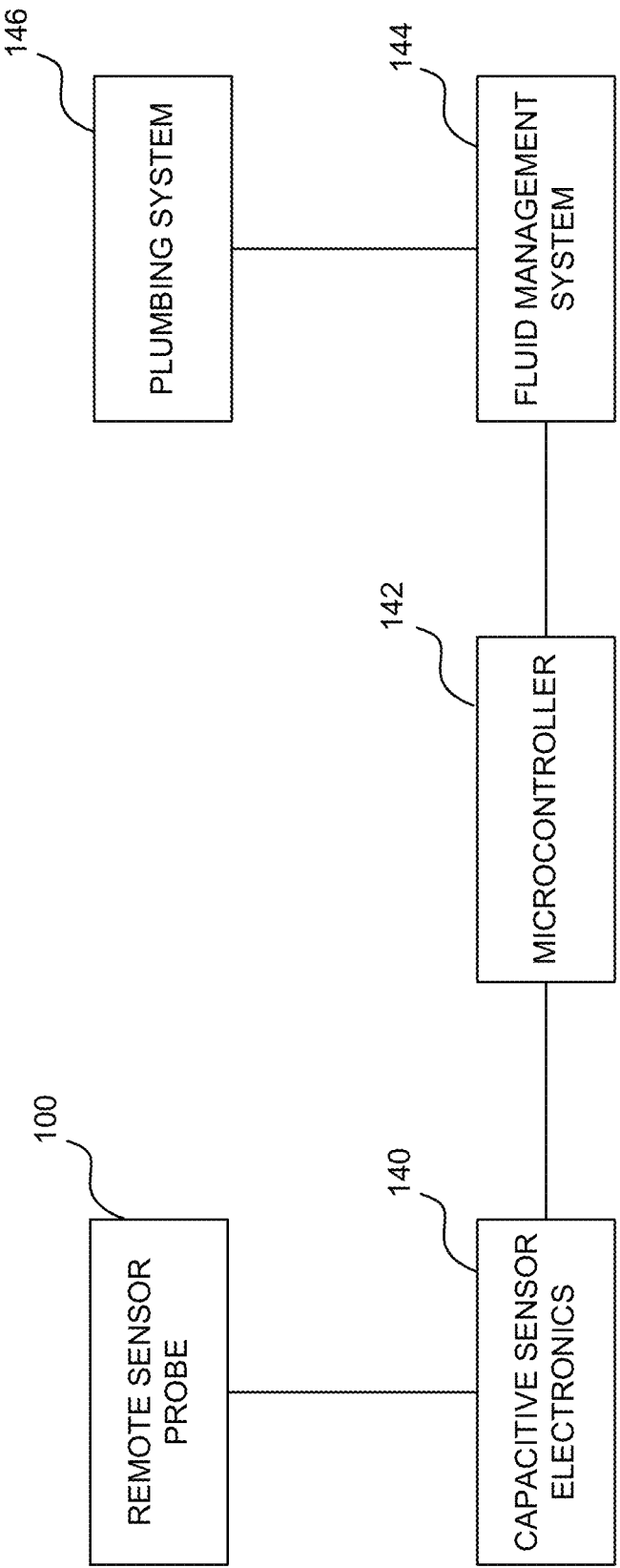
FIG. 3 is a functional block diagram of a control system utilizing the capacitive sensor of FIG. 1.

As illustrated in FIG. 3, in one aspect of the system, the capacitive sensor probe is in electrical/electronic communication with sensor electronics 140. The sensor electronics may comprise capacitive sensor electronics in electrical communication with the sensor probe. In an illustrative embodiment, the sensor electronics 140 may include a Texas Instruments FDC1004 4-channel capacitance-to-digital converter integrated circuit (IC), or substantial equivalent. A capacitive channel of the IC is electrically connected to the inner conductor of the coaxial electrode 106 which is in turn connected to the radiator 102 of the sensor probe. The IC and metallic portion(s) of the vat walls are grounded to a common ground. The outer conductor of the coaxial electrode 106 is electrically connected with the IC as an active or sensing shield to reduce electromagnetic interference and parasitic capacitance from sources other than the sensor probe. The sensor electronics 140 converts the analog capacitive signal generated by the sensor electronics into a digital signal for communication, via a I$^2$C serial bus, to a microcontroller or processor 142.

Referring still to FIG. 3, the microcontroller 142, for example a STM32 family microcontroller available from STMicroelectronics, Geneva, Switzerland, receives the digital signal from the sensor electronics 140. The digital signal is representative of a level of capacitance created by the fluid surrounding the sensor probe, and is communicated to the microcontroller 142 as a capacitive value. The microcontroller 142 is in communication with a fluid management system 144, which controls (i.e., operates) the components of a plumbing system 146 in communication with the fluid management system. The plumbing system may include piping, valves and pumps that allow the flow of fluid, such as cooking oil, to and from the vat.

Figure 4:
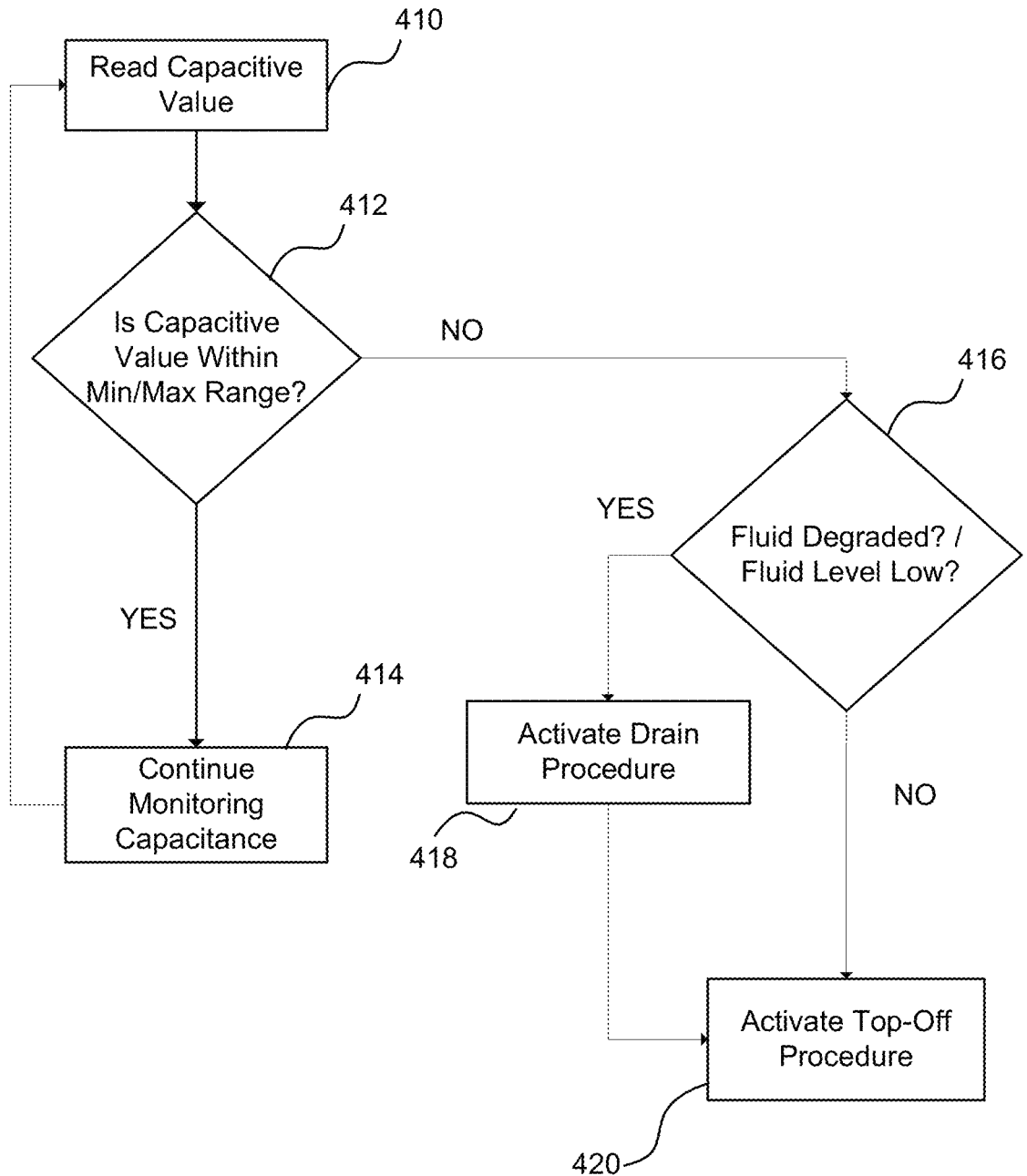
FIG. 4 is a flow diagram of operation of the capacitive sensor of FIG. 1 controlled by the control system of FIG. 3.

Referring now to FIG. 4, illustrative processing by the microcontroller 142 is illustrated. The microcontroller 142 reads the digital capacitive value 410 from the sensor electronics 140. The illustrative control processing, implemented by microcontroller program code, then determines 412 if the capacitive value is within a minimum and maximum acceptable range of the sensor probe and sensor electronics 140. An illustrative acceptable range for a capacitance determination in a fryer vat application may be, for example 0 picofarad (pF) (minimum) to 16 pF (maximum). If the capacitive value is within the min/max range, then the controller may deem the presence of fluid in the vat is acceptable. If such a determination is made, the microcontroller may continue to monitor the capacitance from the sensor 414.

Still referring to FIG. 4, if the capacitive value read by the microcontroller 142 is within the min/max range, the microcontroller may determine 416, whether the fluid level in the vat itself is below the acceptable level. The capacitance of fluid, such as cooking oil with a quantity of polar materials, may be detectable and distinguishable from the capacitance of air, indicative of a low level of cooking oil. For example oil in an illustrative embodiment may have a capacitive value of 6-8 pF, while air may, for example, have a capacitive value of 2-3 pF. Of course these values may be different, and determined empirically, depending on the embodiment and implementation and other factors. If the fluid level is determined to be low, the microcontroller 142 may initiate a top-off procedure.

Figure 5:
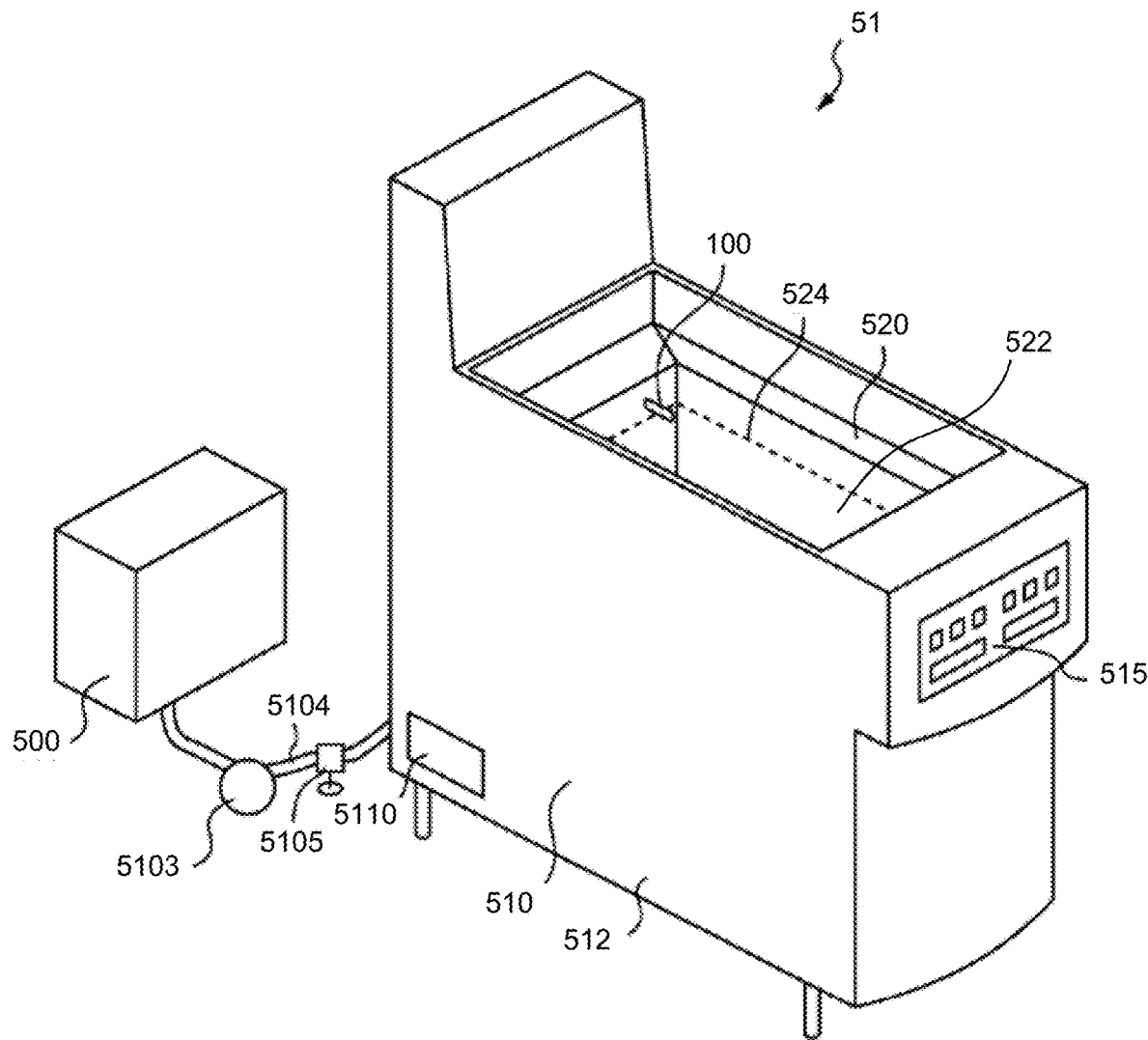
FIG. 5. is a perspective view of an illustrative embodiment of a deep fryer with a capacitive sensor for determining the existence of oil within the frypot or vat.

Turning now to FIG. 5, a fluid detection system 51 is provided. For the sake of illustration, the fluid detection system is discussed below with respect to use with a commercial deep fat fryer 510. The illustrative fluid detection system is readily utilized with a deep fat fryer 510 where cooking liquid, such as oil, is continuously lost from the vat due to being soaked within the food product being cooked there within. Traditionally, the oil level within the cooking vat of conventional fryers must be periodically manually monitored during periods of heavy use and the kitchen operators must often manually fill the cooking vat with fresh oil. Embodiments of the instant fluid detection system provide for an automatic signal that fluid level has dropped below the level of the sensor placement, which allows for automatic refilling of oil into the vat, and/or for an alarm to the kitchen operator that oil needs to be added to the vat.

The fryer 510 used with the fluid detection system may include a housing 512 that supports a vat 520. The fryer 510 includes a heater (either an electrical or gas burner) to continuously or cyclically provide heat to the cooking liquid disposed within the vat 520. The vat 520 may receive a basket (not shown) that holds food product within the heated cooking liquid (such as oil) to cook the food, and then can be removed to easily remove the food product from the cooking liquid. The fryer 510 includes the fluid detector, or capacitive sensor 100 that is disposed within, or extending into the vat 520 (various placements and orientations of the sensor 100 are possible, such as illustrated in the FIGS., e.g. FIG. 5 and FIGS. 6(a)-(c) as described hereinafter). The fryer 510 may have a control panel 515 that allows for user inputs to control the cooking functions of the fryer 510 as well as the settings, ranges and thresholds of the sensor 100. The control panel 515 may communicate with a control system 5110 (shown schematically in FIG. 5) including a microprocessor, to automatically or manually operate the fryer 510 and its associated plumbing system. As shown schematically in FIG. 5, the fryer 510 and specifically the vat 520 may be fluidly connected to a source of cooking liquid such as in a holding tank 500, which may be either pumped to the vat 520 or allowed to gravity drain to the vat 520.

In operation, when the capacitive sensor 100 detects a low fluid level, via the capacitive value of air, the control system 5110 may automatically direct replacement fluid to the vat 520. The control system 5110 may operate a pump 5103 that applies suction to the holding tank 500 and directs replacement liquid to the vat 520, and may open one or more isolation valves 5105 to allow cooking liquid to refill the vat 520 via pipes or fluid conduits 5104.

Upon completion of the cooking liquid refill cycle (as measured by one or more of a new capacitive sensor reading from the capacitive sensor 100, elapsed time, change in level of the holding tank 500, or by other parameters), the control system 5110 may return to periodically or continually monitoring the capacitance readings of the fluid detector 100. In some embodiments, upon a determination that the liquid level is below the appropriate level 524, the control system 5110 may also de-energize the heaters within the vat 520, and reenergize (to return to the normal heating cycle) when liquid level returns to the normal level 524.

The capacitive sensor 100, as described hereinbefore in relation to FIGS. 1, 2A-2E, and 3, may be disposed within the vat 520 in a position with the radiator (102, best shown in FIG. 1) at a level representative of the desired minimum cooking oil level within the vat for safe and efficient operation. The sensor 100 is provided to detect the presence of cooking oil at a necessary level for safe operation, and to provide a signal to a microcontroller 142 (FIG. 3). The sensor, via the sensor electronics 140 (described hereinbefore), provides the controller 142 with a capacitive value signal that is representative of the presence or absence of cooking oil proximate to the sensor at the necessary level within the vat 520. The microcontroller 142 receives the capacitive value signal and based upon the signal received either provides control signals to the fluid management system and associated plumbing or continues periodic or continuous monitoring of the fluid level.

The capacitive sensor 100 produces a capacitive value as a function of the fluid that surrounds the sensor, i.e. between the sensor and the walls of the vat (in the location depicted in FIG. 5 as extending from the rear wall of the vat and adjacent a side wall 522 of the vat 520), with the sensor probe acting as one plate of a capacitor and the wall(s) of the vat acting as a second plate of the capacitor. The capacitance of cooking oil (heated or around room temperature) is significantly different than the capacitance of air, such that the microcontroller 142, receives a capacitive value signal that is representative of the measured capacitance of the cooking oil present or air (i.e., lacking cooking oil). Based on the capacitive value, the microcontroller 142 sends control signals to the fluid management system to either maintain the current fluid levels, supplement with additional fluid. It should be appreciated that with appropriate programming, the microcontroller 142 may determine what type of fluid is proximate to the sensor (e.g., oil, water, air) or may determine the presence of debris or other material within the fluid.

In some embodiments, the sensor may be calibrated such that the sensed capacitance (and therefore the existence and level of fluid proximate to the sensor) is specifically based upon positioning of the sensor within the vat. That is, sensed capacitive value may be a function of the position of the sensor with respect to, for example, a wall 522 of the vat 520. While the system may be calibrated based upon the specific position of the sensor within the vat, in relation to a structure of the vat, one of ordinary skill in the art should appreciate that calibration may be based on non-vat structures placed in proximity to the sensor and made a part of the circuit/system as described herein. Generally, sufficient space should exist between the sensor and the structure (e.g. wall) for an amount of fluid to be positioned between the sensor and structure for a reliable and repeatable capacitance level of fluid, e.g. cooking oil, to be achieved. In one aspect, the vat may contain or define a cavity within its walls suitable for placement of the sensor 100, such that the sensor may be recessed in the vat, yet still be surrounded by fluid.

As described, the microcontroller receives a signal from the sensor, via the sensor electronics 140, that is proportional to the capacitance of fluid present, which capacitance may be calibrated based on the type of fluid. Memory in association with the microcontroller (e.g. a look-up table) maintains capacitance information based upon type of fluid, e.g. appropriate ranges or "windows" of capacitive value, that are correlated to control signals to send to the fluid management system 144, to either maintain, supplement and/or drain fluid from the vat.

In some embodiments, the sensor and system may be calibrated to provide a signal that is understood by the controller that cooking oil surrounds the sensor when the sensor is fully covered by cooking oil (in some embodiments, specifically the radiator shell 102), i.e. cooking oil surrounds the entire circumferential side surface of the sensor. In some embodiments, the sensor and system may be calibrated to provide a signal that is understood by the controller that cooking oil surrounds the sensor when about 90% of the height, or in other embodiments 90% of the total circumferential area, of the sensor is surrounded by cooking oil. Other calibrations may be contemplated and are within the scope of the disclosure.

In some embodiments, the controller may be programmed to provide an error message to the user (by way of a message board, digital readout, warning light, audible signal, or the like when the measured capacitance does not fall within a value (or range of values) of calibrated capacitance of cooking oil (room temperature through hot), water, or air. In this case, it is possible that the sensor is not operating properly, or it is possible that the surfaces of the sensor or perhaps the surfaces of the walls that are proximate to the sensor (side wall or the like) are covered with foreign materials such that the measured capacitance differs from the normally calibrated capacitance. The error message may prompt the user to investigate the cause, and to take steps to cure the same, e.g. mechanically cleaning the surface of the sensor or the walls of the vat to try to clear the error message.

While the fluid detection systems above are depicted as used by a deep fryer, one of ordinary skill in the art will appreciate that other equipment may benefit from the cooking level detection system disclosed herein, such as rethermalizers, pasta cookers, and the like. Further, one of ordinary skill in the art would readily understand any appropriate modifications to the system disclosed herein for application with other equipment that could benefit from this system.

In other embodiments, the fluid detector 100 may be disposed within other types of containers associated with other cooking appliances (or for that matter other types of machines) where the level of fluid is normally heated above ambient temperature and is normally preferably maintained above a specific level of the container, or within a specific level range.

Although the sensor as described herein is configured and disposed to sense the capacitance between the sensor and wall of the vat in the illustrative embodiment, and thereby determine the relative capacitance of the fluid (or lack of fluid) in the vat, from which it can be determined that sufficient fluid is present in order to provide pertinent information to a control system, it should be appreciated by those skilled in the art that rather than a metallic/conductive wall of the vat the sensor may be used as described to determine capacitance between the sensor and another structure, and the capacitive sensor and control system according to the disclosure may be used in a different context other than a frying vat. For example, in a non-fryer context (or non-metallic or metallic reservoir context), a conductive structure may be provided (rather than a wall of the context structure) proximate to the sensor, and operate in accordance with the disclosure to sense capacitance of the content of the reservoir.

Figure 6:
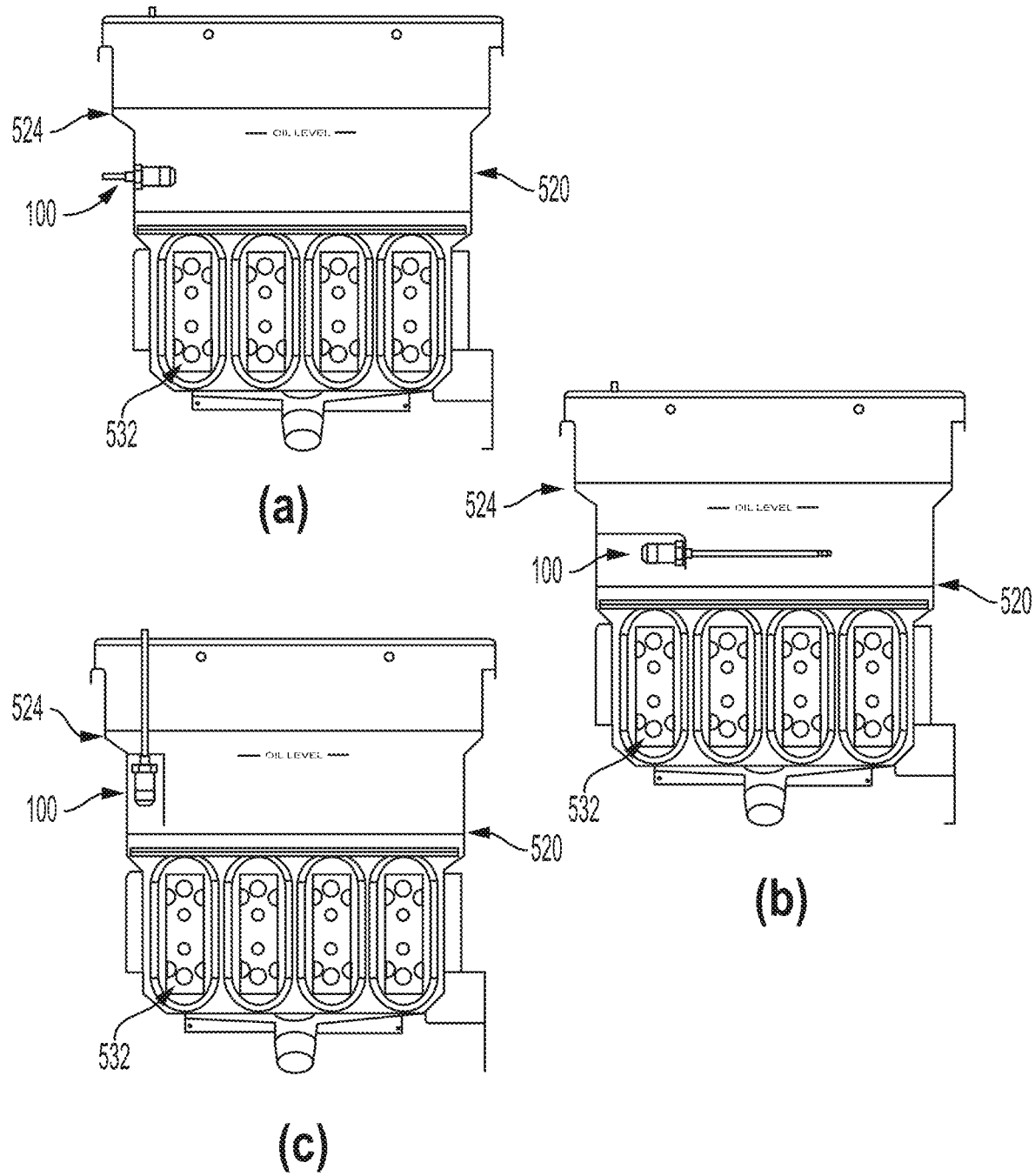
FIG. 6(a-c) are side-views of various placements or orientations of a capacitive sensor according to the disclosure.

FIGS. 6(*a-c*) are side-views of various placements 600, 601, 602 of a capacitive sensor 100 according to the disclosure. According to one aspect, as shown in FIG. 6(*a*), a capacitive sensor 100 may be located on the side of the vat 532 extending through a side-wall of the vat. The capacitive sensor 100 may be disposed, in alternative orientations, horizontally within the vat 520, as shown in FIGS. 6(*a*) and 6(*b*). FIG. 6(*c*) depicts the capacitive sensor 100 in an alternative orientation, vertically disposed in the vat 520. The vat 520 may define a recess or a cavity in which the sensor 100 may be placed such that there is one or more surfaces surrounding the sides of the sensor from which to obtain a capacitive reading. An oil fill level 524 may be defined at a level substantially near or above the sensor 100 such that when the level of oil is sensed to be below the sensor, or a portion of the sensor, a top-off procedure may be initiated.

While various aspects of the present disclosure depict and discuss specific locations and orientations of the capacitive sensor 100, one of ordinary skill in the art will recognize that other positions, orientations and configurations may be implemented without deviating from the scope of the invention.

A fryer vat 520 may include heat sources such as burner tubes 532. The fluid in the fryer vat 520 may be heated with the heat source 532, for example gas burners or electrical heating elements, to produce heat that is transferred to the cooking oil. In embodiments where gas burners are used, the burners may be positioned to ignite a flame outside of the vat 520, with the combustion products sent through burner tubes 532 that extend beneath the vat, with the surfaces of the burner tube 532 transferring heat to the cooking liquid. In embodiments where electrical heaters are used, the heaters may be disposed directly within the vat such that the surface of the heaters contact cooking liquid for transfer of heat to the cooking liquid.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A fryer system, comprising:
 a vat for receipt of a volume of fluid;
 a capacitive sensor disposed within the vat such that the sensor is disposed to communicate with the volume of fluid within the vat, the capacitive sensor comprises a geometric metallic shell radiator structure at a first end and a jack at an end distal from the radiator structure, a cable electrically connected to the radiator structure and to a portion of the jack;
 a tank for holding a reserve of fluid;
 a plumbing system establishing fluid communication between the tank of the vat and the tank holding the reserve fluid, the plumbing system comprising one or more valves and a pump;
 a controller receiving a signal representing a capacitive value from the capacitive sensor and controlling operation of the plumbing system based on the capacitive value, wherein the controller operates the one or more valves and the pump of the plumbing system to maintain a fluid level in the vat.

2. The fryer of claim 1, wherein the cable is a coaxial cable with an inner conductor electrically connected to the radiator structure and to the portion of the jack.

3. The fryer of claim 1, wherein the capacitive sensor is positioned proximate to an inner structure of the vat.

4. The fryer of claim 1 wherein the capacitive sensor is calibrated to detect a fluid in the vat.

5. The fryer of claim 2, wherein the geometric metallic shell radiator structure of the capacitive sensor comprises a receptacle disposed within the shell for connecting the coaxial cable within the radiator structure.

6. The fryer of claim 1 wherein the operation of the one or more valves and the pump of the plumbing system comprises establishes a flow of fluid from the tank to the vat.

7. The fryer of claim 1 wherein the capacitive sensor is configured to detect a level of polar materials in the fluid.

8. The fryer of claim 1 wherein the capacitive sensor is disposed vertically in the vat.

9. The fryer of claim 1 wherein the capacitive sensor is disposed horizontally in the vat.

10. The fryer of claim 1 wherein the capacitive sensor is disposed extending through a sidewall of the vat.

\* \* \* \* \*